(12) United States Patent
Fujii

(10) Patent No.: US 7,007,081 B2
(45) Date of Patent: Feb. 28, 2006

(54) PERIPHERAL EQUIPMENT OF COMPUTER

(75) Inventor: Tetsuya Fujii, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 786 days.

(21) Appl. No.: 10/021,504

(22) Filed: Dec. 19, 2001

(65) Prior Publication Data

US 2003/0135589 A1    Jul. 17, 2003

(51) Int. Cl.
*G06F 15/77* (2006.01)

(52) U.S. Cl. .................... 709/221; 709/229; 710/15

(58) Field of Classification Search ........ 709/201–203, 709/221–229, 300–301; 710/8, 15
See application file for complete search history.

(56) References Cited

U.S. PATENT DOCUMENTS

| | | | | |
|---|---|---|---|---|
| 5,530,895 | A * | 6/1996 | Enstrom ........................ | 710/9 |
| 5,764,593 | A * | 6/1998 | Turpin et al. ................... | 713/2 |
| 6,026,226 | A | 2/2000 | Heile et al. ............ | 395/500.13 |
| 6,102,964 | A | 8/2000 | Tse et al. ....................... | 716/18 |
| 6,110,223 | A | 8/2000 | Southgate et al. ............. | 716/18 |
| 6,120,550 | A | 9/2000 | Southgate et al. ............. | 716/11 |
| 6,134,705 | A | 10/2000 | Pedersen et al. .............. | 716/18 |
| 6,161,211 | A | 12/2000 | Southgate ...................... | 716/1 |
| 6,175,868 | B1 * | 1/2001 | Lavian et al. ................ | 709/223 |
| 6,182,247 | B1 | 1/2001 | Herrmann et al. ............ | 714/39 |
| 6,263,387 | B1 * | 7/2001 | Chrabaszcz ................. | 710/302 |
| 6,330,597 | B1 * | 12/2001 | Collin et al. ................. | 709/220 |
| 6,513,113 | B1 * | 1/2003 | Kobayashi ..................... | 713/2 |
| 6,519,659 | B1 * | 2/2003 | Stevens ........................ | 710/15 |
| 6,578,142 | B1 * | 6/2003 | Anderson et al. .............. | 713/2 |
| 6,622,179 | B1 * | 9/2003 | Welder ......................... | 710/15 |

FOREIGN PATENT DOCUMENTS

JP          11-65781         3/1999

\* cited by examiner

*Primary Examiner*—Zarni Maung
*Assistant Examiner*—Van Nguyen
(74) *Attorney, Agent, or Firm*—Foley & Lardner LLP

(57) ABSTRACT

A communication section of computer peripheral equipment connected to a network is disconnected from the network. A current network setup value set in the communication section is saved in a first storage section. A fixed network setup value stored in a second storage section is set in the communication section. By using the fixed network setup value, a maintenance operator, for example, uses a computer having an installed maintenance tool to communicate with the communication section, and thus performs maintenance of the peripheral equipment.

5 Claims, 3 Drawing Sheets

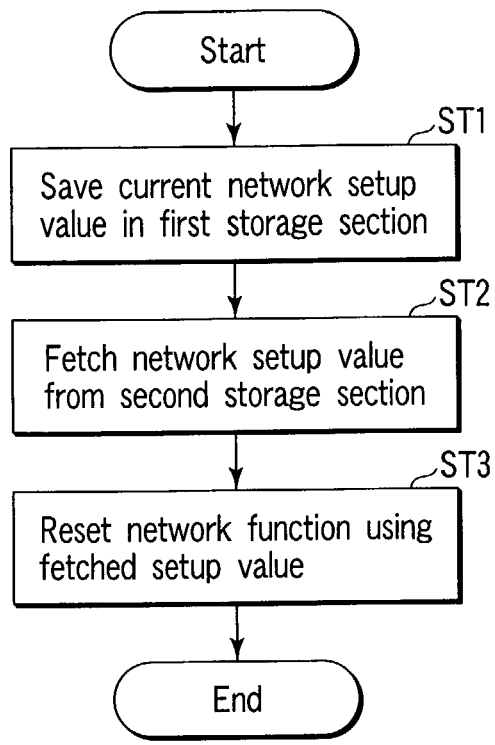
F I G. 5
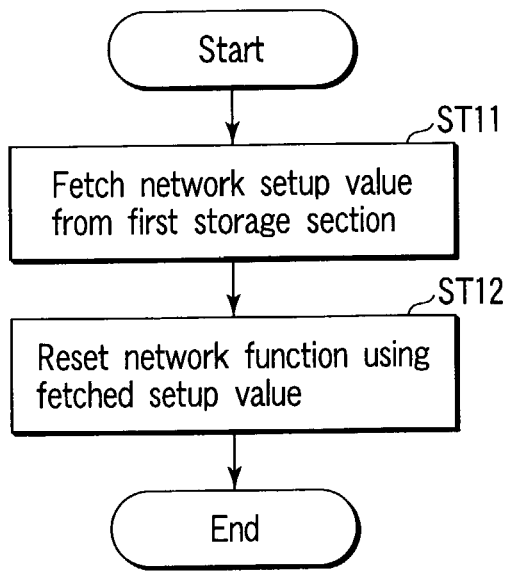
F I G. 6

PERIPHERAL EQUIPMENT OF COMPUTER

BACKGROUND

The invention relates to peripheral computer equipment, which is to a computer via a network.

Combined equipment having many functions, such as a print function, a copy function, a facsimile function and an electronic mail function is a type of peripheral equipment of a computer. The combined equipment is connected to a network, such as a LAN.

Maintenance of such combined equipment is performed by using, for example, a PC (a personal computer) connected to the same network. In order that a maintenance operator may perform maintenance on the combined equipment, using a PC with an installed maintenance tool, the maintenance operator has to enable communication between the PC and the combined equipment. More specifically, the maintenance operator needs to obtain an appropriate IP address assigned by a user of the combined equipment and set up an IP address in the PC for maintenance.

However, the maintenance operator may not obtain permission for temporary use of the IP address or authorization for access to the network from the standpoint of the security on the side of the user. In this case, the maintenance operator disconnects the combined equipment from a user's network environment and connects the combined equipment directly to the PC for maintenance, by a cross cable or the like.

In this case, the maintenance operator must change the network setup of the PC in accordance with the network setup of the combined equipment in order to enable network communication between the PC for maintenance and the combined equipment.

However, it becomes impossible for the maintenance operator to perform maintenance using the network when changes cannot be made in the network setup of the PC. Thus, the need arises to connect the PC for maintenance to the combined equipment by means of a method other than a LAN, such as a serial connection. To realize this connection, some combined equipment is provided with a local I/F for direct connection and a maintenance function using the local I/F.

To change the network setup of the PC for the purpose of maintenance of the combined equipment, the maintenance operator has heretofore had to check the network setup of the combined equipment and perform setup on the PC in accordance with the network setup of the combined equipment before starting maintenance. Thus, a problem exists: that is, time is required before the maintenance can start.

Moreover, the maintenance operator is required to have such knowledge and skill that he/she can change the network setup of the PC in accordance with the on-the-spot network environment.

Moreover, the maintenance operator may change the network setup of the combined equipment for the purpose of the maintenance of the combined equipment, and in this case, he/she needs to take notes of the current network setup without fail before changing the setup of the combined equipment. If the maintenance operator forgets to restore the network setup of the combined equipment to its original state or makes a mistake in restoration in taking notes of the current network setup, it then becomes impossible to connect the combined equipment to the network, and this causes the user a great deal of trouble.

Moreover, when the combined equipment includes a device for local connection, such as a serial I/F, and a function using the device so as to prepare for no permission for access to the network, this leads to a rise in costs of hardware and software.

It is an object of the invention to provide peripheral equipment of a computer, which can change the network setup of equipment in a short time by a simple operation, and thus allows a maintenance operator to perform maintenance of the equipment with ease.

According to an aspect of the present invention, there is provided peripheral equipment of a computer which comprises: a communication section connected to the computer via a network; an operation section to perform an operation of changing a network setup of the communication section; a first storage section to save a current network setup value set in the communication section; a second storage section to previously store a fixed network setup value; means for saving in the first storage section the network setup value set in the communication section in accordance with an operation command from the operation section; and means for setting in the communication section the fixed network setup value stored in the second storage section, in place of the saved network setup value.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and comprise a part of the specification, illustrate an embodiment of the invention, and together with the general description given above and the detailed description of the embodiment given below, serve to explain the principles of the invention.

FIG. 5 is a flowchart that shows a process of changing a network setup value by a main control section of the combined equipment of FIGS. 1 and 2, which changing process is used to perform the maintenance; and FIG. 6 is a flowchart that shows a process of restoring the network setup value by the main control section of the combined equipment of FIGS. 1 and 2.

DETAILED DESCRIPTION

An embodiment of the invention will be described below with reference to the drawings.

Figure 1:
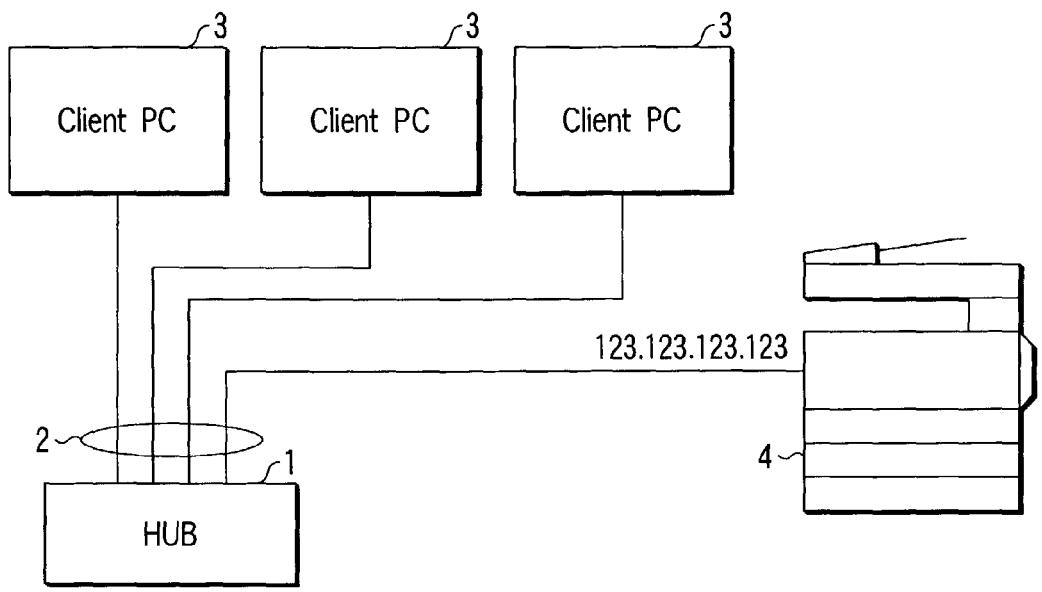
FIG. 1 is a block diagram of a network system that shows an embodiment of the present invention, which embodiment includes combined equipment.

As shown in FIG. 1, a LAN is used as a network environment. A HUB 1 is connected to a plurality of client PCs 3 through a LAN cable 2, and the HUB 1 is also connected to combined equipment 4 which is peripheral equipment of a computer, through the LAN cable 2.

Figure 2:
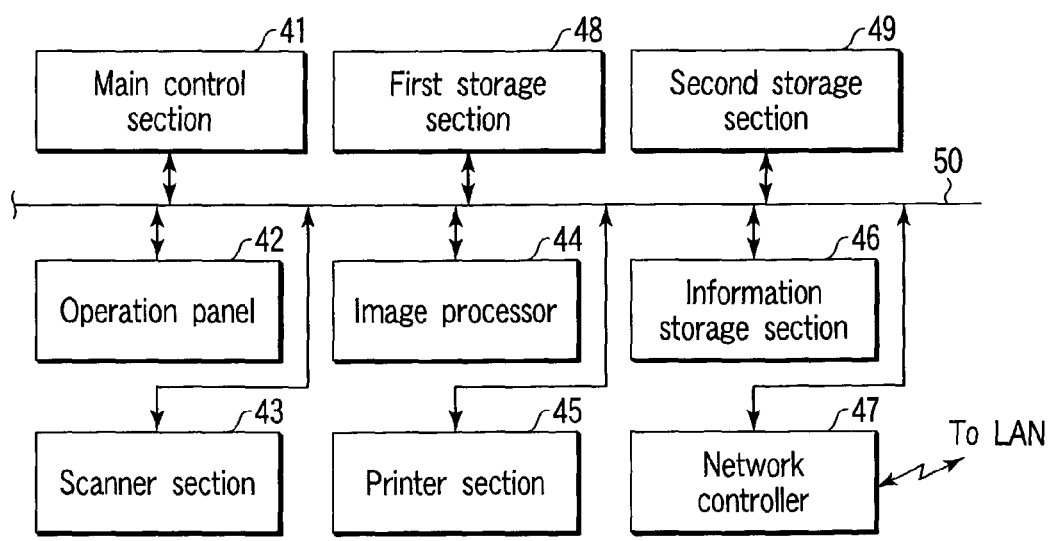
FIG. 2 is a block diagram that shows a configuration of the combined equipment of the embodiment shown in FIG. 1.

As shown in FIG. 2, the combined equipment 4 comprises a main control section 41 which controls many functions of the equipment, an operation panel 42 having a touch panel with various types of keys on a display screen, and a scanner section 43 which captures image information from an original document.

The combined equipment 4 also comprises an image processor 44 which processes image information captured by the scanner 43, a printer section 45 which prints image information, character information and the like, and an information storage section 46 which stores image information, character information and the like.

The combined equipment 4 also comprises a network controller 47 which is connected to the LAN cable 2 and functions as a communication section which communicates with the client PC 3 and the like via the network.

The combined equipment 4 also comprises a first storage section 48 to save the current network setup value set in the network controller 47, and a second storage section 49 in which a fixed network setup value is previously stored.

The parts constituting the combined equipment 4 are electrically connected to one another through a bus line 50. The main control section 41 comprises a CPU and a ROM, and the main control section 41 is configured to control the parts in accordance with program data stored in the ROM.

The information storage section 46 is comprised of a dynamic RAM.

The first storage section 48 is a device, which is rewritable during operation of the combined equipment 4 and whose contents are not erased even when the combined equipment 4 is turned off under operation, such as a nonvolatile RAM, a flush ROM or an HDD.

The second storage section 49 is a device, whose contents are not erased even when the combined equipment 4 is turned off, such as a nonvolatile RAM, a flush ROM or an HDD. At the time of manufacture, necessary values are stored in the second storage section 49.

In the network environment shown in FIG. 1, TCP/IP is used as a protocol, and IP addresses are assigned as the network setup values to the client PCs 3 and the combined equipment 4.

A value other than the IP address may be used as the network setup value.

For example, the IP address 123.123.123.123 is assigned to the combined equipment 4.

Figure 3:
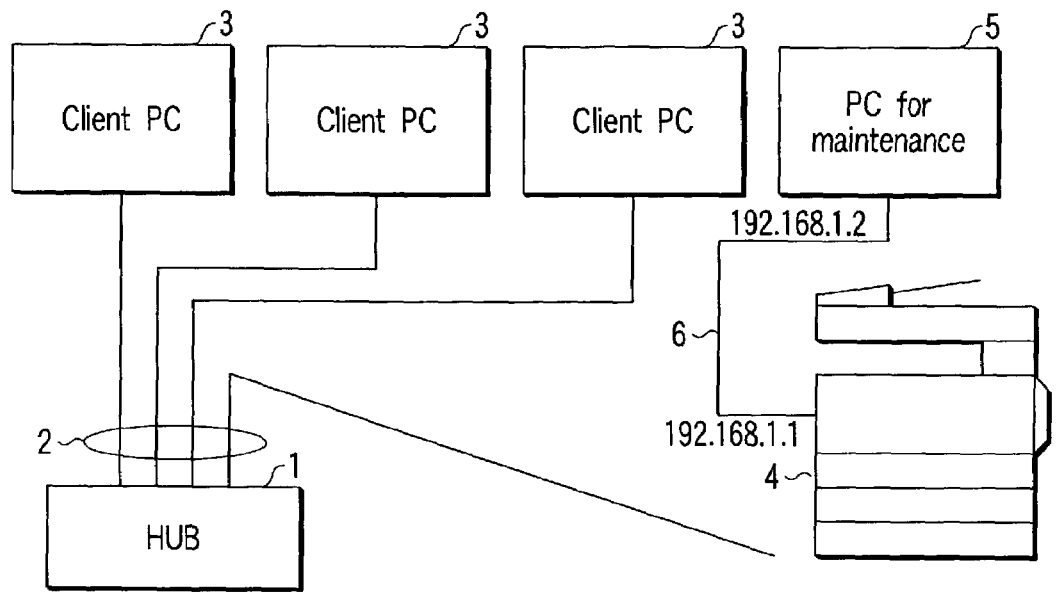
FIG. 3 is a block diagram that shows a configuration of the network system of FIG. 1, which system is used to perform maintenance of the combined equipment by using a PC.

FIG. 3 shows the network environment shown in FIG. 1 in which a maintenance operator performs maintenance of the combined equipment 4 using a PC 5 for maintenance with an installed maintenance tool.

More specifically, the LAN cable 2 connected to the HUB 1 is disconnected from the combined equipment 4. Then, a cross cable 6 is used to connect the PC 5 for maintenance to the combined equipment 4. Also when the cross cable 6 is used, TCP/IP is used as the protocol. In this case, the IP address of the combined equipment 4 is set to, for example, 192.168.1.1, and the IP address of the PC 5 for maintenance is set to, for example, 192.168.1.2.

At the time of manufacture, the IP address 192.168.1.1 of the combined equipment 4 is stored in the second storage section 49 as the fixed network setup value. Also the IP address 192.168.1.2 of the PC 5 for maintenance is set in a memory in the PC.

The IP address 192.168.1.1 is an address which enables communication with the PC 5 for maintenance in which the IP address 192.168.1.2 is set.

As described above, the IP address 192.168.1.2 of the PC 5 for maintenance is previously set, and thus, connection can take place quickly on the spot.

Then, the maintenance operator connects the combined equipment 4 having the set IP address 192.168.1.1 to the PC 5 for maintenance having the set IP address 192.168.1.2. This connection allows communication between a maintenance function of the combined equipment 4 using the network and the maintenance tool installed in the PC 5, so that the maintenance operator can perform maintenance.

Next, a description is given with regard to switching of the network setup value of the combined equipment 4.

The first storage section 48 is used to save the IP address 123.123.123.123 indicative of the current network setup value.

Figure 4:
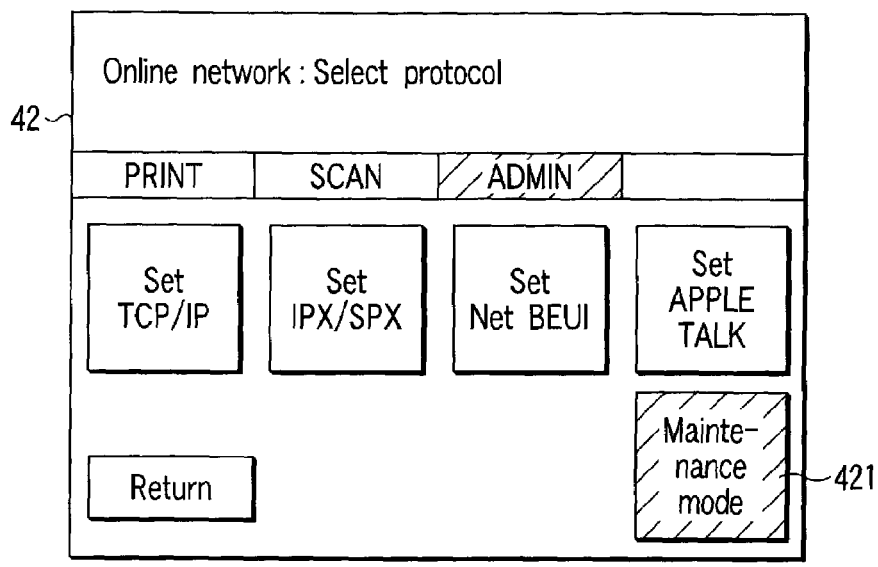
FIG. 4 is an illustration that shows a display screen that is provided on an operation panel of the combined equipment of FIGS. 1 and 2, which display screen is used to perform the maintenance.

FIG. 4 shows a display screen with the touch panel provided on the operation panel 42 of the combined equipment 4. The screen is a screen which only a specific person such as the maintenance operator can use with the touch of the touch panel, and the maintenance operator causes the screen to appear after connecting the PC 5 to the combined equipment 4 by use of the cross cable 6. Then, the maintenance operator touches a maintenance mode key 421 on the screen.

When the maintenance mode key 421 is touched, the main control section 41 performs a changing process shown in a flowchart of FIG. 5.

First, in step ST1, the IP address 123.123.123.123 indicative of the current network setup value set in the network controller 47 is saved in the first storage section 48.

Then, in step ST2, the IP address 192.168.1.1 indicative of the network setup value is fetched from the second storage section 49.

Finally, in step ST3, the fetched IP address 192.168.1.1 is set in the network controller 47 so as to reset a network function.

Thus, the IP address set in the network controller 47 is changed from 123.123.123.123 to 192.168.1.1.

In the changing process, a first touch of the maintenance mode key 421 allows the combined equipment 4 to switch to the setup for maintenance, and the display is inverted.

Then, in this inverted state, another touch of the maintenance mode key 421 allows the main control section 41 to perform a restoring process shown in a flowchart of FIG. 6.

First, in step ST11, the IP address 123.123.123.123 indicative of the network setup value saved in the first storage section 48 is fetched from the first storage section 48.

Then, in step ST12, the fetched IP address 123.123.123.123 is set in the network controller 47 so as to reset the network function.

Thus, the IP address of the network controller 47 indicating the network setup value returns from 192.168.1.1 to 123.123.123.123.

Accordingly, to perform the maintenance of the combined equipment 4, the maintenance operator disconnects the LAN cable 2 connected to the HUB 1 from the combined equipment 4, and then connects the PC 5 for maintenance to the combined equipment 4 by using the cross cable 6.

Then, the maintenance operator operates the operation panel 42 of the combined equipment 4 so as to cause the screen shown in FIG. 4 to appear, and then touches the maintenance mode key 421.

Thus, under the control of the main control section 41, the IP address 123.123.123.123 set in the network controller 47 is saved in the first storage section 48, and then the IP address 192.168.1.1 stored in the second storage section 49, in place of the saved IP address, is set in the network controller 47.

This permits communication between the maintenance function of the combined equipment 4 using the network and the maintenance tool installed in the PC 5, and thus the maintenance operator performs maintenance of the combined equipment 4 by using the maintenance tool of the PC 5.

When the maintenance is over, the maintenance operator again touches the maintenance mode key 421. Thus, the IP address 123.123.123.123 saved in the first storage section 48 is again set in the network controller 47, so that the network function is reset.

In this state, the maintenance operator restores the display screen of the operation panel 42 to the original display screen, then disconnects the cross cable 6 from the combined equipment 4, and then reconnects the LAN cable 2 connected to the HUB 1 to the combined equipment 4. This makes it possible for the combined equipment 4 to again communicate with the client PCs 3 via the network.

In a series of such operations, even if the maintenance operator forgets to restore the IP address of the network controller 47 to the original IP address thereof after the end of maintenance, the maintenance operator easily becomes aware that he/she has forgotten to perform the operation of restoring the IP address to the original IP address, because the maintenance mode key 421 remains reversed. Moreover, even a user, as well as the maintenance operator, can easily perform the operation of restoring the IP address to the original IP address.

As described above, the maintenance operator can simply switch the combined equipment 4 to the network setup for maintenance without discarding the current network setup of the combined equipment 4.

Therefore, the maintenance operator can quickly perform maintenance using the network function under no influence of uncertainties and variables, that is, the network environment which is used by the user who owns the combined equipment 4.

When the maintenance is over, the maintenance operator can surely restore the network setup to its original state by a simple operation.

Moreover, the combined equipment 4 and the PC 5 for maintenance can be surely connected by the LAN, and therefore the combined equipment 4 does not require a local I/F for maintenance as standard equipment, so that this allows a reduction in costs of hardware and software.

Although the invention is described above by referring to the above-mentioned embodiment using the combined equipment having many functions as the peripheral equipment of a computer, the invention is not necessarily limited to this embodiment. More specifically, the invention may be applied to any peripheral equipment as long as the peripheral equipment communicates with a computer via a network.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. Peripheral equipment of a computer comprising:
    a communication section connected to the computer via a network;
    an operation section to perform an operation of changing a network setup of said communication section;
    a first storage section to save a current IP address set in said communication section;
    a second storage section in which a fixed IP address is previously stored;
    means for saving in said first storage section the IP address set in said communication section in accordance with an operation command from said operation section; and
    means for setting in said communication section the fixed IP address stored in said second storage section, in place of the saved IP address.

2. The peripheral equipment of a computer according to claim 1, further comprising:
    means for resetting the fixed IP address set in said communication section to the IP address saved in said first storage section in accordance with another operation command from said operation section.

3. Peripheral equipment of a computer comprising:
    a communication section connected to the computer via a network;
    means for transmitting and receiving various types of adjusted values and service information of said equipment to/from the computer by using said communication section;
    an operation section to perform an operation of changing a network setup of said communication section;
    a first storage section to save a current IP address set in said communication section;
    a second storage section to previously store a fixed IP address which enables communication with a computer having a specific network setup;
    means for saving in said first storage section the IP address set in said communication section in accordance with an operation command from said operation section;
    means for setting in said communication section the fixed IP address stored in said second storage section, in place of the saved IP address; and
    means for communicating with the computer having the specific network setup by using the fixed IP address set in said communication section.

4. The peripheral equipment of a computer according to claim 3, further comprising:
    means for resetting the fixed IP address set in said communication section to the IP address saved in said first storage section in accordance with another operation command from said operation section.

5. Peripheral equipment of a computer comprising:
    communication means connected to the computer via a network;
    operating means for performing an operation of changing a network setup of said communication means;
    first storing means for saving a current IP address set in said communication means;
    second storing means in which a fixed IP address is previously stored;
    means for saving in said first storing means the IP address set in said communication means in accordance with an operation command from said operating means; and
    means for setting in said communication means the fixed IP address stored in said second storing means, in place of the saved IP address.

* * * * *